(No Model.) 2 Sheets—Sheet 1.
G. J. WILLIAMS & F. R. SILK.
MANUFACTURE OF SCREW HOOKS.
No. 337,722. Patented Mar. 9, 1886.
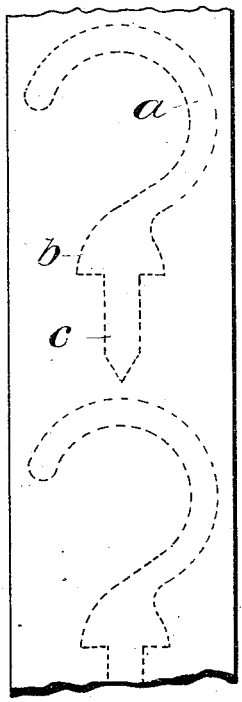
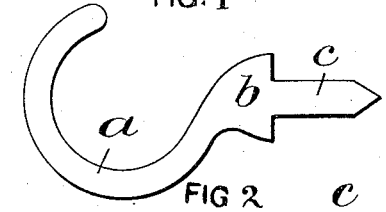
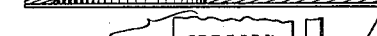
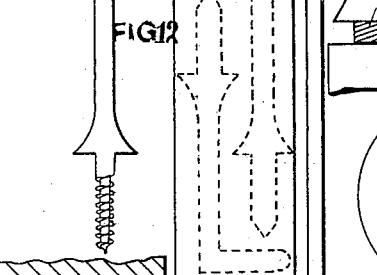
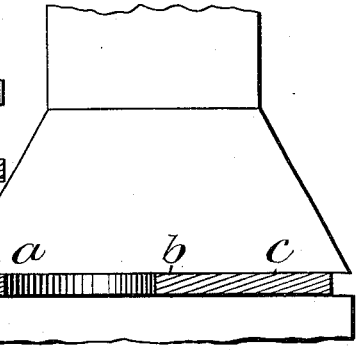
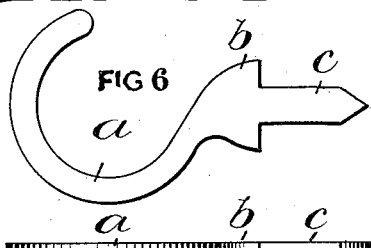
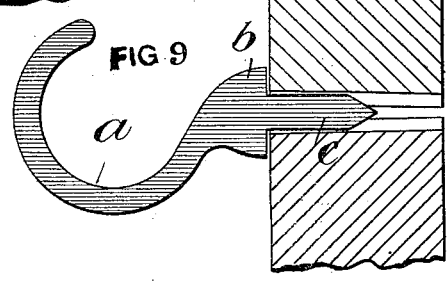
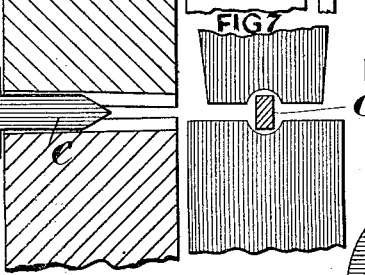
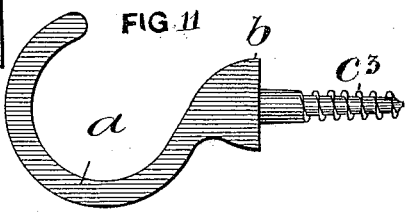
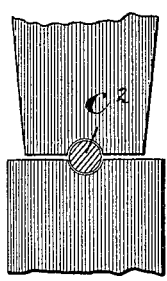
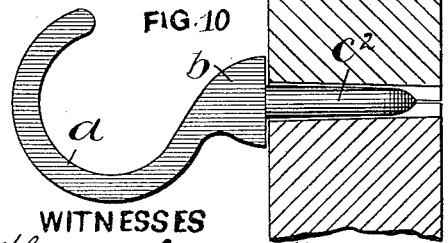
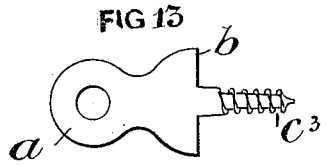
WITNESSES
INVENTORS (No Model.) 2 Sheets—Sheet 2.
G. J. WILLIAMS & F. R. SILK.
MANUFACTURE OF SCREW HOOKS.
No. 337,722. Patented Mar. 9, 1886.
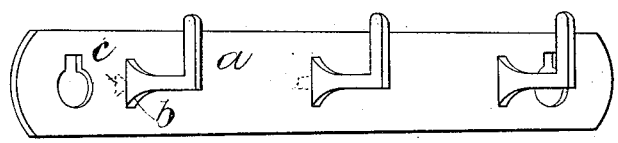
FIG 17
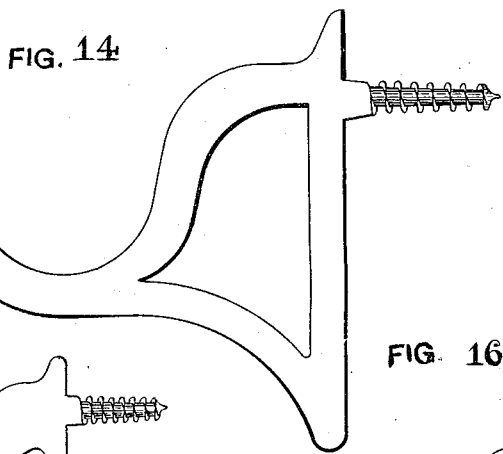
FIG. 14
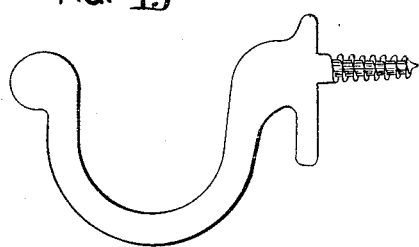
FIG. 15
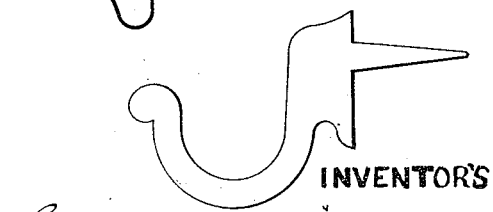
FIG. 16
WITNESSES
Henry Sherrett
Miles E. Hughes
INVENTORS
George James Williams
Francis Robert Silk

UNITED STATES PATENT OFFICE.

GEORGE JAMES WILLIAMS, OF BIRMINGHAM, AND FRANCIS ROBERT SILK, OF SPARKBROOK, COUNTY OF WARWICK, ENGLAND.

MANUFACTURE OF SCREW-HOOKS.

SPECIFICATION forming part of Letters Patent No. 337,722, dated March 9, 1886.

Application filed January 6, 1886. Serial No. 187,817. (No model.) Patented in England September 16, 1885, No. 10,962.

*To all whom it may concern:*

Be it known that we, GEORGE JAMES WILLIAMS, of Birmingham, in the county of Warwick, England, manufacturer, and FRANCIS ROBERT SILK, of Sparkbrook, near Birmingham, England, commercial traveler, have invented new improvements in the manufacture of screw-hooks, cup-hooks, wardrobe and pole hooks, and other hooks and eyes of like manufacture, (for which we have made application for Letters Patent in Great Britain, No. 10,962, dated September 16, 1885,) which is fully set forth in the following specification, reference being had to the accompanying drawings.

Our invention consists of the improvements hereinafter described in the manufacture or production of screw-hooks, cup-hooks, coat-hooks, wardrobe-hooks, cornice-pole brackets, and other brackets and hooks of like manufacture, whereby the manufacture of the said articles is much simplified and economized.

By our invention we dispense with the ordinary process of manufacture by cutting out the hook in its entirety from sheet metal by tools worked in a press or by other means.

In carrying out our invention in the production of brass hooks we take, preferably, a thick plate of metal with a polished or planished surface, which is subsequently rolled down to the required gage, which acquires a bright or planished surface in the reduced thickness, and from this sheet metal a hook-blank is cut having the requisite hook formation which forms the front part of the hook, the attachment-shank, which is afterward wormed, and the collar or shoulder which comes between the hook and the screwed shank, thus cutting or producing a screw-hook all in one piece and out of sheet metal. The shoulder of the screw-hook is preferably somewhat curved or chamfered on the stem side of the hook, while on the screwed side the collar is made straight, so that the straight edge shall lie perfectly flush with the object to which it is screwed. The square shank of the hook thus cut out from sheet metal may, if necessary, be rounded or the sharp edges removed by pressure with semicircular she or half dies. The sharp edges of the stem of the hook, collar, and the terminal end of the hook may be rounded off or removed by tools or pressure, or by other equivalent means.

The attachment-shank, instead of being wormed, may be plain, in the form of a spike, which is driven instead of being screwed.

In applying our invention to the production of other hooks and brackets we proceed substantially in the manner hereinbefore described with respect to screw and other hooks.

Having described the nature of our invention, we will proceed to describe, with reference to the accompanying drawings, the manner in which the same is to be performed.

We will describe our invention in conjunction with tools which constitute part of our invention.

Figure 1 represents a side elevation, Fig. 2 an edge view, and Fig. 3 a longitudinal section, of a cup-hook blank cut out in its entirety from a sheet or plate of metal, Fig. 4. Fig. $4^a$ is an edge view of Fig. 4—that is, we take a sheet or strip of sheet or plate brass or other suitable metal or alloy, and by means of tools worked in a press or stamp we cut out a blank, Fig. 1, having the requisite hook formation, shoulder, and stem or shank all in one piece and out of sheet metal.

$a$ is a cup-hook formation; $b$, the shoulder or collar, which is somewhat curved or chamfered on the hook side, while the stem or shank side is straight, in order to lie perfectly flat with the object to which the screw-hook is attached.

$c$ is the stem or shank, square or rectangular in cross-section, which said stem is subsequently operated upon by concave half-round tools, in order to shape or round the stem upon which a screw-thread is wormed.

Thus the process of manufacture is as follows: The hook-blank, Fig. 1, is cut out of sheet metal, Fig. 4, and the burr thrown up by the cutting-out tools is removed by the flattening-dies, Fig. 5, producing a hook-blank (shown in front and side elevation, Fig. 6) with all burr or rough edges removed; or, instead of the flattening-dies, edging-tools may be substituted therefor, which round the sharp edges and remove the burr at the same time. The square or rectangular stem of the hook-blank, Fig. 6, is next operated upon by half-round concave tools, Fig. 7, which round the said stem to the cross-section shown at Fig. 8. Thus by the bringing together of the tools or half-dies the rectangular or square shank is made round. Fig. 9 is a transverse section of the dies, Fig. 7, before the dies are brought together and the stem rounded and elongated by the squeezing of the metal between the concaves or hollows of the tools. Fig. 10 is a transverse section of the dies, Fig. 8, after the dies have been brought together on the blank and the stem rounded and elongated thereby. The stem or shank $c^2$ is now wormed with the screw-thread $c^3$, thereby producing a screw-hook made in one piece and from sheet metal, as shown in Fig. 11. Fig. 12 shows a screw-hook made in the manner described; Fig. 13, a screw-eye which is of like manufacture. Fig. 14 is a pole-hook; Fig. 15, a wardrobe-hook; Fig. 16, a spike-hook—that is, the shank is rounded by the tools or left square, which hook can be driven instead of being screwed into an object. Fig. 17 shows a series of hooks cut from sheet metal and attached to sheet-metal plates by passing the stems or shanks $c$ through holes formed in the plates and riveting them at the back. In this class of hooks the stems or shanks are only of sufficient length to pass through the holes in the plate, while leaving sufficient metal for the riveting of the end. These hooks, arranged in a series, as represented, are useful for the hanging of keys and other articles.

Having thus described our invention, we claim as new and desire to secure by Letters Patent—

1. Making the hook $a$, shoulder $b$, and stem $c$ of screw-hooks and other hooks and eyes of like manufacture in one piece and from sheet metal—that is, making or cutting out the hook or the blank of the hook in its entirety from sheet metal—substantially as described and set forth.

2. Shaping or fashioning the rectangular or square stems or shanks $c$ of hook or eye blanks cut from sheet metal by concave half-round dies, which round and fashion the stem subsequently to it being wormed, substantially as described, and set forth in Figs. 7, 8, 9, and 10 of the drawings.

Signed this 5th day of December, 1885.

GEORGE JAMES WILLIAMS.
FRANCIS ROBERT SILK.

Witnesses:
  HENRY SKERRETT,
  MILES E. HUGHES,
    *Both of Birmingham.*